Patented Jan. 27, 1953

2,626,871

UNITED STATES PATENT OFFICE 2,626,871

CHEMICALLY BONDED CARBON REFRACTORY

William K. Zinszer, Pasadena, Calif., assignor to to Gladding, McBean & Co., Los Angeles, Calif., a corporation of California No Drawing. Application November 14, 1949, Serial No. 127,269

4 Claims. (Cl. 106—56)

This invention relates to refractory compositions which are resistant to the action of molten ferrous metals and slags, and is particularly directed to compositions and their methods of treatment, whereby refractories in unburned form particularly adapted for use in lining equipment, containing molten metals, may be readily manufactured.

The lining of ladles, transfer cars, furnaces, and other equipment in which molten metals are produced or carried presents many different problems. Not only does molten metal exist at extremely high temperatures and, therefore, necessitate the use of refractories capable of withstanding the high temperatures without softening or liquefication, but in addition, most industrial operations involving the transfer of molten metals are carried out in the presence of slag. These slags, in their liquid state, exert a remarkable solvent action upon refractories and this is well illustrated by the fact that erosion of ladle linings is usually most pronounced at the slag line or surface of the metal. The slag appears to wet the usual refractories, flow into the interstices or porosities of the brick or lining and rapidly dissolve, combine with, and erode the refractory lining.

In many instances, nozzles, runways, and furnace linings cannot be effectively made from preformed brick or blocks and it is desirable to make such nozzles, runways, etc., from a refractory composition capable of being rammed into place so as to form a monolithic structure. When preformed brick is employed, the joints between the brick permit the entry of corrosive slags which rapidly deteriorate the structure; when a monolithic lining is used, it has greater longevity. However, refractory materials heretofore employed have to be preburned before they can be used in blast furnaces, ladles, and other units; the preburning developing the desired refractory characteristics.

The present invention is applicable to the production of predetermined shapes, such as standard brick, arch brick, keys, etc., which need not be burned before such brick is installed in ladles, furnaces, or other equipment in which molten metals are produced or carried.

Furthermore, the present invention relates to a composition which can be rammed into place, thereby permitting the formation of monolithic linings, nozzles, etc., of a highly refractory character, free from joints.

Moreover, the present invention pertains to a refractory composition which is not wetted by molten metal and slags and is extremely resistant to erosion.

Generally stated, the invention pertains to a refractory composition combining, essentially, granular hard coke, virtually free from volatile compounds, a refractory clay and added chemical reagents which form a refractory bonding agent in situ.

In accordance with the present invention, these refractory compositions can either be formed into predetermined shapes under pressure, or rammed into position to form monolithic linings. When preformed shapes are made, they need not be burned prior to installation in the equipment in which they are to be used, the chemical bonding agent holding the refractory composition together so that it maintains its preformed shape, can be exposed to the weather, is not disintegrated by exposure to rain or water, and can be handled and shipped without undue breakage.

Since, in normal production of refractories, it is generally necessary to burn such refractories to temperatures of 1200°–1600° C. for a prolonged period of time, it will be evident that the elimination of this time consuming and expensive burning materially reduces manufacturing costs.

It is an object of the present invention to disclose and provide an improved composition having an exceptional resistance to the action of molten ferrous metals and their slags.

A further object of this invention is to disclose and provide, as an article of commerce, an unburned refractory for use in lining equipment containing molten metals, said refractory composition consisting essentially of hard coke, a refractory clay, and an added refractory bonding agent formed in situ.

A still further object of the invention is to disclose and provide a method of manufacturing refractory compositions containing coke and refractory clays which do not soften at the elevated temperatures at which molten ferrous metals exist, which adequately maintain their strength at such temperatures and which are not wetted by the slags normally present.

These and various other objects and advantages of the present invention will become apparent to those skilled in the art from the following description and examples.

The primary ingredients employed in the manufacture of compositions coming within the scope of this invention comprise coke and refractory clay. The coke employed is preferably petroleum coke, and again such coke is preferably substantially free from volatile matter.

Although the term "coke" as used herein includes coke produced by the destructive distillation of coal, petroleum coke (resulting from the cracking of petroleum oils), particularly when it has been subjected to continued heating for the elimination of virtually all volatile components and is therefore free from tars, heavy oils, etc., is preferred. The presence of free carbon is not detrimental.

The coke employed is preferably granular; the screen analysis of the coke depending somewhat upon the use to which the final composition is to be put and the form which the refractory is to assume, i. e. whether it is to be preformed before installation, or whether it is to be rammed into place.

When the coke is to be employed in the manufacture of preformed bodies, it has been found desirable to use a coke containing not more than about 1½% of volatile matters, all of the coke passing a 30-mesh sieve, but not more than 10% passing a 60-mesh sieve. In general, it may be stated that the calcined coke is preferably a graded aggregate, the sizes of coke particles being so classified as to form a relatively dense body; the particles being arranged in somewhat the same manner that siliceous aggregate is blended for the production of dense concrete.

It may be noted at this point that the use of very finely divided coke is not conducive to the production of strong refractories and therefore it is desirable to use coke including particles which will pass a 16 or 10-mesh sieve, but which will be retained on a 30 or 40-mesh sieve when maximum strength of the refractory under working conditions and elevated temperatures is desired.

The refractory clay employed in the composition may be any good flint clay having a pyrometric cone equivalent of above about 26. Clays having P. E. C. of 30, 32 or 34 are preferred. Moreover, clays having a relatively low total shrinkage are preferred. Whether the clay is of the kaolinic, siliceous, or aluminous type is not material, the primary requirement being that it contain a low content of total fluxes and have the necessary refractoriness. Plasticity of the clay is not important.

Analyses of clays which have been successfully employed are given here for illustrative purposes only:

|  |  | A. | B. |
|---|---|---|---|
| P. C. E. |  | 32–33 | 27–28 |
| $SiO_2$ | percent | 47.6 | 50.04 |
| $Al_2O_3$ | do | 31.1 | 30.99 |
| $Fe_2O_3$ | do | 3.1 | 6.22 |
| $TiO_2$ | do | 1.5 |  |
| CaO | do | 0.5 | 0.42 |
| MgO | do | 0.72 | 0.40 |
| $Na_2O$ & $K_2O$ | do | 0.47 | 1.08 |
| Ignition Loss | do | 14.5 | 10.94 |

The clay employed is preferably milled to about 10 or 20-mesh and is used in uncalcined form. The use of calcined clay grog has a tendency to produce a more open body. In some instances, particularly when it is desired to use the minimum quantity of clay, it is preferable to employ the clay very finely divided, that is to say ground to pass a 60-mesh sieve.

In addition to the coke and refractory clay, the method of the present invention employs chemical reagents adapted to react and form within the coke-clay mixture a refractory, insoluble bond. Various reagents may be used, but the formation of aluminum phosphate in situ has given eminently satisfactory results. Aluminum phosphate may be formed by the use of ammonium phosphate and aluminum sulphate. It may also be formed by the use of phosphoric acid and aluminum chloride. It can also be formed by the use of sodium phosphate and a water soluble aluminum salt, such as aluminum chloride, but in such instances sodium salts are formed as by-products and these are somewhat undesirable, since they have low melting points.

It may be noted that in general it is preferable to use chemical reagents which will form a crystalline refractory bonding agent and a volatilizable by-product. For example, in the event phosphoric acid and aluminum chloride are used as reagents, these reagents may be added to the mixture of coke and clay in the form of slurries or solutions and the reaction forms aluminum phosphate, hydrochloric acid and water. The latter two products of reaction are readily eliminated during drying. The use of the reagents in quantities sufficient to produce aluminum phosphates, wherein the ratio of alumina to $PO_4$ is relatively high, is preferred. By "relatively high ratios" reference is made to ratios of approximately 1:2 and thereabove.

Instead of forming aluminum phosphate, other chemical bonding agents, such as magnesium phosphate, magnesium aluminate, aluminum zincate, etc., may be formed in situ. Magnesium aluminate, for example, may be formed by the use of magnesium chloride and aluminum hydroxide. Magnesium aluminate has a melting point of about 2135° C. Aluminum zincate (which may be represented as $ZnO.Al_2O_3$) having a melting point of 1950° C. may be made by the reaction of aluminum chloride and zinc phosphate.

The refractory compositions may be made from the coke, clay, and added reagents by mixing the coke and clay thoroughly and then adding aqueous solutions or suspensions of the reagents to the mixture and reblending.

An alternative method, which appears to produce stronger bars (based on modulus of rupture results) comprises mixing the clay with the aqueous solutions or suspensions of the reagents and then adding the coke and reblending. Since the clay and coke are in granular or finely divided condition, the reagents are preferably added in the form of solutions or suspensions, thereby imparting to the total mixture the necessary 5%–8% of water (preferably 6%–7%) which facilitates the pressing or forming of the mixture into the desired shape or form. If insufficient moisture is present in the refractory composition, the brick or other shape is not pressed as easily and appears to lack the hardness and stability which is attained when 6%–8% of moisture is present.

The proportion of coke to clay may vary within considerable limits. Although refractories suitable for use in contact with molten metals and slags can be made which contain as low as 15%, by weight, of the calcined coke, in most instances 30%–90% of coke gives better results. When 85%–95% of coke is employed and the clay content is reduced to 5%–15%, it is important that attention be paid to the grain sizing of the coke and the fineness of the clay. Although, as previously stated, 20-mesh clay can be used when, say 30%–50% coke is employed, the clay is preferably reduced to a finer state of division, say to 60-mesh, when it is to be employed in compositions containing 80% or more of coke. It is to be understood that when 20%–30% of coke is employed, such coke is practically equal in volume to the clay used.

The reagents employed are used in quantity sufficient to form 3%–6% chemical bond by wetting of the mixture, i. e., for each 100 lbs. mixture of coke and clay, one can use 3 lbs. of water containing 2 lbs. aluminum chloride and 3 pints phosphoric acid. These reagents are preferably added separately to the mixture of coke and clay, or are separately added to the clay and then followed by the coke. The moistened mixture can then be pressed into the desired form at normal brick press pressures and the formed objects can be dried in the usual manner. Drying temperatures of 200°–250° F. are sufficient.

The dried objects exhibit a remarkably high strength, for example, the modulus rupture on the unburned brick (7 inch centers) will be of the order of 900–1500 lbs. per square inch. The brick will be stable and exhibit an absorption on the order of 8%–10% upon being boiled for two hours. As a result, these unburned refractories can be stacked in the open, exposed to the weather, shipped and handled without breakage and without loss of strength.

The most remarkable characteristics are exhibited when these refractories are subjected to the action of molten ferrous metals and their slags. Whereas, an ordinary ladle brick will completely disintegrate and melt away when subjected to open hearth slag at between 2700° and 2800° F. for a period of 30 minutes, these refractories will show very little if any erosion.

Moreover, whereas ordinary refractories, when subjected to such test, become pitted, eroded, and their surfaces are coated with a glassy, smooth, glaze-like coating, the chemical bonded coke refractories of the present invention exhibit a rough, homogeneous surface which may occasionally hold a droplet of slag. The angle of contact between such droplets and the surface of the refractory is high, indicating that the slag and molten metal does not wet the brick. Freedom from adhering slag is particularly noticeable in mixes high in coke. Even those mixes which show appreciable adherence of slag to the surface of the refractory brick are not eroded or eaten away, as is the case with normal ladle brick and similar refractories.

It also may be noted that upon exposure to open hearth slag, at temperatures on the order of 2800° F., the refractories of the present invention may swell slightly, but do not crack or become distorted. When the unburned refractories are installed in a ladle, or other unit, it is highly desirable to thoroughly preheat the ladle before introducing molten metal thereinto. The introduction of the first charge of molten metal into a newly lined ladle should be done cautiously, since some dehydration of the chemical bond takes place at high temperatures, and foaming of the molten metal may occur at the time of the initial charge.

It is to be understood that the examples given herein are illustrative only and all changes and modifications coming within the scope of the appended claims are embraced thereby.

I claim:
1. As an article of commerce, an unburned, compressed and formed refractory for use in contact with ferrous metals and their slags, composed essentially of between about 25% and 95%, by weight, of a hard granular coke, virtually free from volatile components, 75% to 5%, by weight, of a refractory clay, and from about 2% to 6%, by weight, of a crystallized aluminum phosphate, the crystals being formed in situ and extending into the porosities of the coke.

2. A method of making an unburned, compressed and formed refractory resistant to the action of molten metal and slags comprising: blending 25%–95%, by weight, of granular coke with 75%–5%, by weight, of a refractory clay and introducing into the mixture aqueous solutions of aluminum chloride and an inorganic, water-soluble reagent containing a phosphoric acid radical, said solutions being adapted to combine and form a refractory, bonding agent and a volatilizable by-product, said bonding agent being aluminum phosphate; molding the mixture into desired shape and drying the molded shape.

3. A method of making an unburned, compressed and formed refractory resistant to the action of molten metal and slags consisting of: blending 25%–95% by weight of granular coke with 75%–5% by weight of a refractory clay and introducing into the mixture aqueous solutions of aluminum chloride and an inorganic, water-soluble reagent containing a phosphoric acid radical; molding the mixture into the desired shape and drying the molded shape, said solutions combining to form crystallized aluminum phosphate as a bonding agent throughout the molded shape.

4. A method of making an unburned, compressed and formed refractory resistant to the action of molten metal and slags consisting of: mixing finely divided refractory clay with aqueous solutions of aluminum chloride and an inorganic, water-soluble reagent containing a phosphoric acid radical; mixing 5%–75% by weight of such moistened clay with 95%–25% of granular coke; molding the mixture into the desired shape and drying the molded shape, said solutions combining to form crystallized aluminum phosphate throughout the molded shape, said solutions being present in quantity sufficient to form from about 2% to 6% of aluminum phosphate by weight of the molded shape.

WILLIAM K. ZINSZER.

REFERENCES CITED

The following references are of record in the file of this patent:

UNITED STATES PATENTS

| Number | Name | Date |
|---|---|---|
| 428,747 | Eames | May 27, 1890 |

FOREIGN PATENTS

| Number | Country | Date |
|---|---|---|
| 136,013 | Austria | 1933 |
| 2,075 | Australia | 1931 |
| 520,889 | Great Britain | 1940 |